US012437159B2

(12) United States Patent
Haikin et al.

(10) Patent No.: US 12,437,159 B2
(45) Date of Patent: Oct. 7, 2025

(54) METHODS AND SYSTEMS FOR ENHANCED SEARCHING OF CONVERSATION DATA AND RELATED ANALYTICS IN A CONTACT CENTER

(71) Applicant: GENESYS CLOUD SERVICES, INC., Menlo Park, CA (US)

(72) Inventors: Lev Haikin, Tel-Aviv (IL); Avraham Faizakof, Tel-Aviv (IL); Nelly David, Tel-Aviv (IL); Eyal Orbach, Tel-Aviv (IL); Rotem Maoz, Tel-Aviv (IL)

( * ) Notice: Subject to any disclaimer, the term of this patent is extended or adjusted under 35 U.S.C. 154(b) by 0 days.

(21) Appl. No.: 18/386,335

(22) Filed: Nov. 2, 2023

(65) Prior Publication Data
US 2025/0165720 A1    May 22, 2025

(51) Int. Cl.
| | |
|---|---|
| *G06F 40/40* | (2020.01) |
| *G06F 16/951* | (2019.01) |
| *G06F 40/279* | (2020.01) |
| *G06F 40/35* | (2020.01) |
| *G06Q 30/015* | (2023.01) |

(52) U.S. Cl.
CPC ............ *G06F 40/40* (2020.01); *G06F 16/951* (2019.01); *G06F 40/279* (2020.01); *G06F 40/35* (2020.01); *G06Q 30/015* (2023.01)

(58) Field of Classification Search
CPC ...... G06F 40/40; G06F 16/951; G06F 40/279; G06F 40/35; G06F 16/33295; G06Q 30/015; G06Q 10/10; G06Q 30/01; G06Q 30/0201; G06Q 50/01; G06N 3/044; G06N 3/045; G06N 3/08; G06N 5/00
See application file for complete search history.

(56) References Cited

U.S. PATENT DOCUMENTS

| | | | |
|---|---|---|---|
| 12,334,063 B1 * | 6/2025 | Xiao | ..................... G10L 15/063 |
| 2022/0156298 A1 | 5/2022 | Mahmoud et al. | |
| 2022/0237232 A1 * | 7/2022 | Quamar | ............. G06F 16/2465 |
| 2023/0112369 A1 | 4/2023 | Chopra et al. | |
| 2024/0303422 A1 * | 9/2024 | Fabian | ............... G06F 16/3329 |
| 2024/0378400 A1 * | 11/2024 | Zhang | .................... G06F 40/40 |
| 2025/0201241 A1 * | 6/2025 | Zhong | .............. G06F 16/33295 |

FOREIGN PATENT DOCUMENTS

WO    2021092272 A1    5/2021

OTHER PUBLICATIONS

International Search Report and Written Opinion in co-pending PCT application PCT/US2024/054158 mailed on Feb. 20, 2025.

\* cited by examiner

*Primary Examiner* — Linda Wong

(57) ABSTRACT

A method in a contact center for generating insights from conversation data derived from interactions and storing the insights in an index. The method may include: determining an insight type; based on the insight type, determining inputs including a question prompt, answer prefix, and relevant portion of the conversation data; inputting the inputs into a LLM configured to receive the inputs and generate output text answering a question contained in the question prompt pursuant to an answer form suggested by the answer prefix given content contained in the relevant portion of the conversation data; generating the output text via operation of the LLM; transforming the output text of the first insight via a sentence transformer into vector embedding representative of a semantic meaning of the output text; and storing the computed vector embedding of the first insight in the index.

20 Claims, 7 Drawing Sheets

METHODS AND SYSTEMS FOR ENHANCED SEARCHING OF CONVERSATION DATA AND RELATED ANALYTICS IN A CONTACT CENTER

BACKGROUND

The present invention generally relates to natural language processing and related analytics in the field of customer service and customer relations management via contact centers and associated cloud-based systems. More particularly, but not by way of limitation, the present invention pertains to automated systems and methods for improved processing and analysis of natural language conversation data for enhancing search capabilities and related analytics in relation thereto.

BRIEF DESCRIPTION OF THE INVENTION

The present invention includes a computer-implemented method for facilitating contact center analytics related to abstractive search. The method includes an offline indexing process for generating insights from conversation data derived from interactions of the contact center and storing the generated insights in an index that enables abstractive search. The conversation data for a given interaction may include text of a natural language conversation occurring between an agent of the contact center and a customer during the given interaction. When described in relation to an exemplary first interaction of the interactions from which a first insight of the insights is generated, the offline indexing process may include the steps of: receiving the conversation data for the first interaction; determining an insight type for generating as the first insight; based on the insight type, determining inputs, the inputs including: a question prompt, an answer prefix, and a relevant portion of the conversation data; inputting the determined inputs into a large language model (LLM), wherein the LLM is configured to receive the inputs and generate output text answering a question contained in the question prompt pursuant to an answer form suggested by the answer prefix given content contained in the relevant portion of the conversation data of the first interaction; generating the output text via operation of the LLM, the generated output text being the first insight; transforming the output text of the first insight via a sentence transformer, wherein the sentence transformer is an embeddings language-model configured to transform the output text by computing a vector embedding representative of a semantic meaning of the output text; and storing the computed vector embedding of the first insight in the index.

These and other features of the present application will become more apparent upon review of the following detailed description of the example embodiments when taken in conjunction with the drawings and the appended claims.

BRIEF DESCRIPTION OF THE DRAWINGS

A more complete appreciation of the present invention will become more readily apparent as the invention becomes better understood by reference to the following detailed description when considered in conjunction with the accompanying drawings, in which like reference symbols indicate like components, wherein.

DETAILED DESCRIPTION

Figure 1:
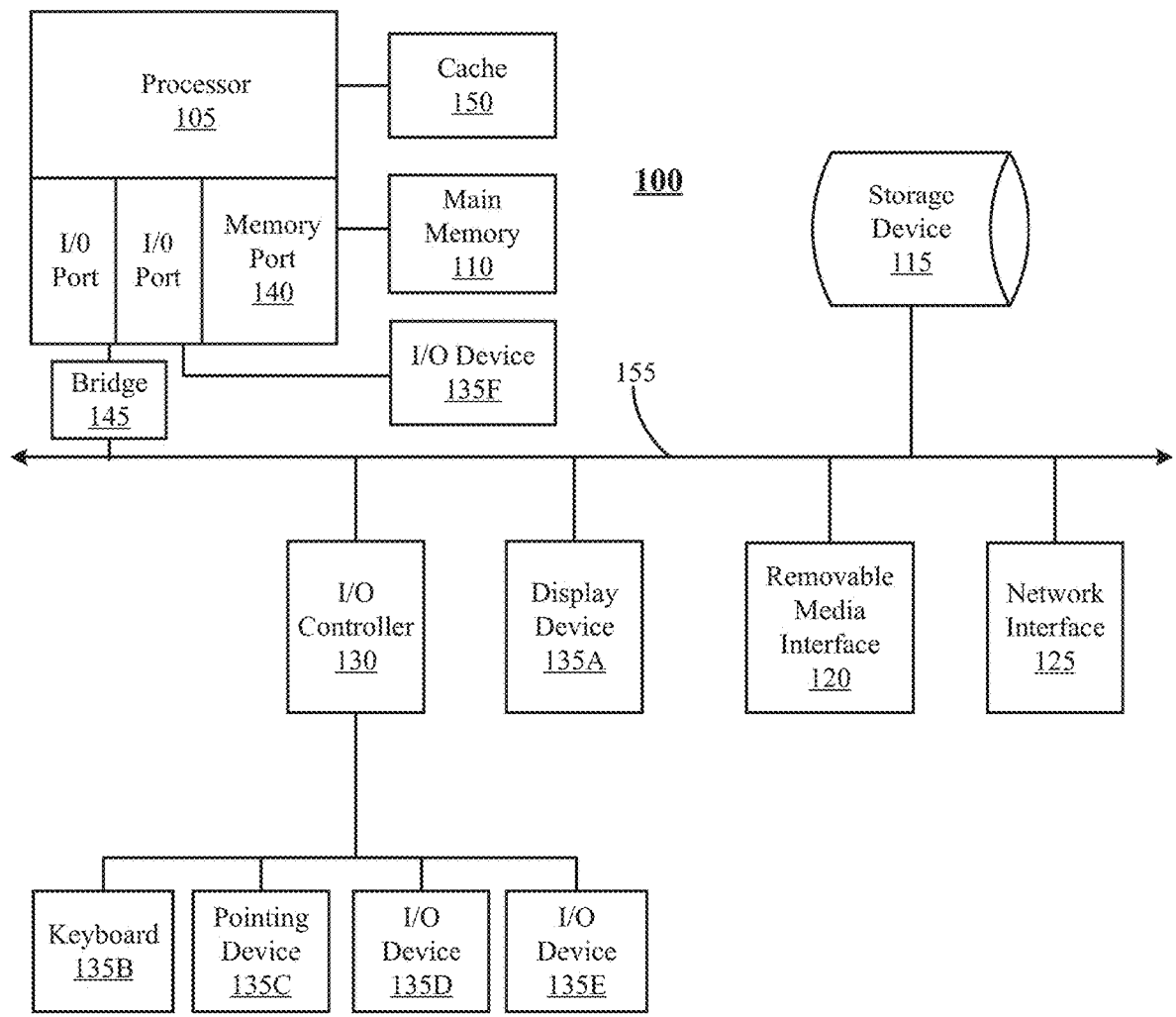
FIG. 1 depicts a schematic block diagram of a computing device in accordance with exemplary embodiments of the present invention and/or with which exemplary embodiments of the present invention may be enabled or practiced.

For the purposes of promoting an understanding of the principles of the invention, reference will now be made to the exemplary embodiments illustrated in the drawings and specific language will be used to describe the same. It will be apparent, however, to one having ordinary skill in the art that the detailed material provided in the examples may not be needed to practice the present invention. In other instances, well-known materials or methods have not been described in detail in order to avoid obscuring the present invention. Additionally, further modification in the provided examples or application of the principles of the invention, as presented herein, are contemplated as would normally occur to those skilled in the art.

As used herein, language designating nonlimiting examples and illustrations includes "e.g.", "i.e.", "for example", "for instance" and the like. Further, reference throughout this specification to "an embodiment", "one embodiment", "present embodiments", "exemplary embodiments", "certain embodiments" and the like means that a particular feature, structure or characteristic described in connection with the given example may be included in at least one embodiment of the present invention. Thus, appearances of the phrases "an embodiment", "one embodiment", "present embodiments", "exemplary embodiments", "certain embodiments" and the like are not necessarily referring to the same embodiment or example. Further, particular features, structures or characteristics may be combined in any suitable combinations and/or sub-combinations in one or more embodiments or examples.

Those skilled in the art will recognize from the present disclosure that the various embodiments may be computer implemented using many different types of data processing equipment, with embodiments being implemented as an apparatus, method, or computer program product. Example embodiments, thus, may take the form of an entirely hardware embodiment, an entirely software embodiment, or an embodiment combining software and hardware aspects. Example embodiments further may take the form of a computer program product embodied by computer-usable program code in any tangible medium of expression. In each case, the example embodiment may be generally referred to as a "module", "system", or "method".

Computing Device

It will be appreciated that the systems and methods of the present invention may be computer implemented using many different forms of data processing equipment, for example, digital microprocessors and associated memory, executing appropriate software programs. By way of background, FIG. 1 illustrates a schematic block diagram of an exemplary computing device 100 in accordance with embodiments of the present invention and/or with which those embodiments may be enabled or practiced. FIG. 1 is provided as a non-limiting example.

The computing device 100, for example, may be implemented via firmware (e.g., an application-specific integrated circuit), hardware, or a combination of software, firmware, and hardware. It will be appreciated that each of the servers, controllers, switches, gateways, engines, and/or modules in the following figures (which collectively may be referred to as servers or modules) may be implemented via one or more of the computing devices 100. As an example, the various servers may be a process running on one or more processors of one or more computing devices 100, which may be executing computer program instructions and interacting with other systems or modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to the computing systems described in the following figures—such as, for example, the contact center system 200 of FIG. 2—the various servers and computer devices thereof may be located on local computing devices 100 (i.e., on-site or at the same physical location as contact center agents), remote computing devices 100 (i.e., off-site or in a cloud computing environment, for example, in a remote data center connected to the contact center via a network), or some combination thereof. Functionality provided by servers located on off-site computing devices may be accessed and provided over a virtual private network (VPN), as if such servers were on-site, or the functionality may be provided using a software as a service (Saas) accessed over the Internet using various protocols, such as by exchanging data via extensible markup language (XML), JSON, and the like.

As shown in the illustrated example, the computing device 100 may include a central processing unit (CPU) or processor 105 and a main memory 110. The computing device 100 may also include a storage device 115, removable media interface 120, network interface 125, I/O controller 130, and one or more input/output (I/O) devices 135, which as depicted may include an, display device 135A, keyboard 135B, and pointing device 135C. The computing device 100 further may include additional elements, such as a memory port 140, a bridge 145, I/O ports, one or more additional input/output devices 135D, 135E, 135F, and a cache memory 150 in communication with the processor 105.

The processor 105 may be any logic circuitry that responds to and processes instructions fetched from the main memory 110. For example, the process 105 may be implemented by an integrated circuit, e.g., a microprocessor, microcontroller, or graphics processing unit, or in a field-programmable gate array or application-specific integrated circuit. As depicted, the processor 105 may communicate directly with the cache memory 150 via a secondary bus or backside bus. The cache memory 150 typically has a faster response time than main memory 110. The main memory 110 may be one or more memory chips capable of storing data and allowing stored data to be directly accessed by the central processing unit 105. The storage device 115 may provide storage for an operating system, which controls scheduling tasks and access to system resources, and other software. Unless otherwise limited, the computing device 100 may include an operating system and software capable of performing the functionality described herein.

As depicted in the illustrated example, the computing device 100 may include a wide variety of I/O devices 135, one or more of which may be connected via the I/O controller 130. Input devices, for example, may include a keyboard 135B and a pointing device 135C, e.g., a mouse or optical pen. Output devices, for example, may include video display devices, speakers, and printers. The I/O devices 135 and/or the I/O controller 130 may include suitable hardware and/or software for enabling the use of multiple display devices. The computing device 100 may also support one or more removable media interfaces 120, such as a disk drive, USB port, or any other device suitable for reading data from or writing data to computer readable media. More generally, the I/O devices 135 may include any conventional devices for performing the functionality described herein.

The computing device 100 may be any workstation, desktop computer, laptop or notebook computer, server machine, virtualized machine, mobile or smart phone, portable telecommunication device, media playing device, gaming system, mobile computing device, or any other type of computing, telecommunications or media device, without limitation, capable of performing the operations and functionality described herein. The computing device 100 include a plurality of devices connected by a network or connected to other systems and resources via a network. As used herein, a network includes one or more computing devices, machines, clients, client nodes, client machines, client computers, client devices, endpoints, or endpoint nodes in communication with one or more other computing devices, machines, clients, client nodes, client machines, client computers, client devices, endpoints, or endpoint nodes. It should be understood that, unless otherwise limited, the computing device 100 may communicate with other computing devices 100 via any type of network using any conventional communication protocol. Further, the network may be a virtual network environment where various network components are virtualized.

Contact Center

Figure 2:
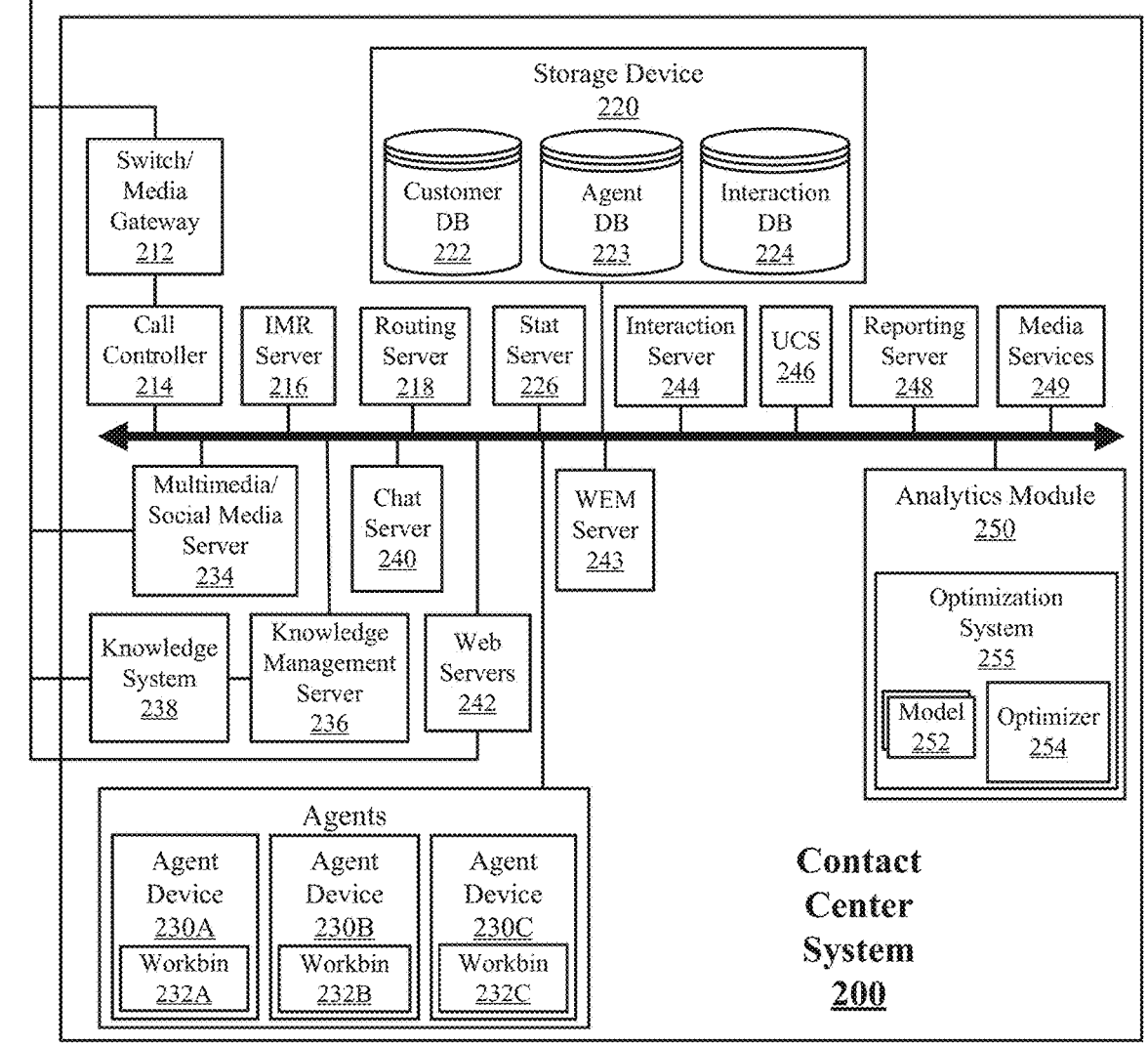
FIG. 2 depicts a schematic block diagram of a communications infrastructure or contact center in accordance with exemplary embodiments of the present invention and/or with which exemplary embodiments of the present invention may be enabled or practiced.

With reference now to FIG. 2, a communications infrastructure or contact center system 200 is shown in accordance with exemplary embodiments of the present invention and/or with which exemplary embodiments of the present invention may be enabled or practiced. It should be understood that the term "contact center system" is used herein to refer to the system depicted in FIG. 2 and/or the components thereof, while the term "contact center" is used more generally to refer to contact center systems, customer service providers operating those systems, and/or the organizations or enterprises associated therewith. Thus, unless otherwise specifically limited, the term "contact center" refers generally to a contact center system (such as the contact center system 200), the associated customer service provider (such as a particular customer service provider providing customer services through the contact center system 200), as well as the organization or enterprise on behalf of which those customer services are being provided.

By way of background, customer service providers generally offer many types of services through contact centers.

Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals" or "customers"). For example, the agents at a contact center may assist customers in making purchasing decisions, receiving orders, or solving problems with products or services already received. Within a contact center, such interactions between contact center agents and outside entities or customers may be conducted over a variety of communication channels, such as, for example, via voice (e.g., telephone calls or voice over IP or VoIP calls), video (e.g., video conferencing), text (e.g., emails and text chat), screen sharing, co-browsing, or the like.

Operationally, contact centers generally strive to provide quality services to customers while minimizing costs. For example, one way for a contact center to operate is to handle every customer interaction with a live agent. While this approach may score well in terms of the service quality, it likely would also be prohibitively expensive due to the high cost of agent labor. Because of this, most contact centers utilize automated processes in place of live agents, such as, for example, interactive voice response (IVR) systems, interactive media response (IMR) systems, internet robots or "bots", automated chat modules or "chatbots", and the like.

Referring specifically to FIG. 2, the contact center system 200 may be used by a customer service provider to provide various types of services to customers. For example, the contact center system 200 may be used to engage and manage interactions in which automated processes (or bots) or human agents communicate with customers. As should be understood, the contact center system 200 may be an in-house facility to a business or enterprise for performing the functions of sales and customer service relative to products and services available through the enterprise. In another aspect, the contact center system 200 may be operated by a third-party service provider that contracts to provide services for another organization. Further, the contact center system 200 may be deployed on equipment dedicated to the enterprise or third-party service provider, and/or deployed in a remote computing environment such as, for example, a private or public cloud environment with infrastructure for supporting multiple contact centers for multiple enterprises. The contact center system 200 may include software applications or programs, which may be executed on premises or remotely or some combination thereof. It should further be appreciated that the various components of the contact center system 200 may be distributed across various geographic locations and not necessarily contained in a single location or computing environment.

Unless otherwise specifically limited, any of the computing elements of the present invention may be implemented in cloud-based or cloud computing environments. As used herein, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Often referred to as a "serverless architecture", a cloud execution model generally includes a service provider dynamically managing an allocation and provisioning of remote servers for achieving a desired functionality.

In accordance with the illustrated example of FIG. 2, the components or modules of the contact center system 200 may include: a plurality of customer devices 205A, 205B, 205C; communications network (or simply "network") 210; switch/media gateway 212; call controller 214; interactive media response (IMR) server 216; routing server 218; storage device 220; statistics (or "stat") server 226; plurality of agent devices 230A, 230B, 230C that include workbins 232A, 232B, 232C, respectively; multimedia/social media server 234; knowledge management server 236 coupled to a knowledge system 238; chat server 240; web servers 242; interaction (or "iXn") server 244; universal contact server (or "UCS") 246; reporting server 248; media services server 249; and analytics module 250. It should be understood that any of the computer-implemented components, modules, or servers described in relation to FIG. 2 or in any of the following figures may be implemented via types of computing devices, such as, for example, the computing device 100 of FIG. 1. As will be seen, the contact center system 200 generally manages resources (e.g., personnel, computers, telecommunication equipment, etc.) to enable delivery of services via telephone, email, chat, or other communication mechanisms. Such services may vary depending on the type of contact center and, for example, may include customer service, help desk functionality, emergency response, telemarketing, order taking, and the like.

Customers desiring to receive services from the contact center system 200 may initiate inbound communications (e.g., telephone calls, emails, chats, etc.) to the contact center system 200 via a customer device 205. While FIG. 2 shows three such customer devices—i.e., customer devices 205A, 205B, and 205C—it should be understood that any number may be present. The customer devices 205, for example, may be a communication device, such as a telephone, smart phone, computer, tablet, or laptop. In accordance with functionality described herein, customers may generally use the customer devices 205 to initiate, manage, and conduct communications with the contact center system 200, such as telephone calls, emails, chats, text messages, web-browsing sessions, and other multi-media transactions.

Inbound and outbound communications from and to the customer devices 205 may traverse the network 210, with the nature of network typically depending on the type of customer device being used and form of communication. As an example, the network 210 may include a communication network of telephone, cellular, and/or data services. The network 210 may be a private or public switched telephone network (PSTN), local area network (LAN), private wide area network (WAN), and/or public WAN such as the Internet. Further, the network 210 may include a wireless carrier network including a code division multiple access (CDMA) network, global system for mobile communications (GSM) network, or any wireless network/technology conventional in the art, including but not limited to 3G, 4G, LTE, 5G, etc.

In regard to the switch/media gateway 212, it may be coupled to the network 210 for receiving and transmitting telephone calls between customers and the contact center system 200. The switch/media gateway 212 may include a telephone or communication switch configured to function as a central switch for agent level routing within the center. The switch may be a hardware switching system or implemented via software. For example, the switch 215 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, one of the agent devices 230. Thus, in general, the switch/media gateway 212 establishes a voice connection between the customer and the agent by establishing a connection between the customer device 205 and agent device 230.

As further shown, the switch/media gateway 212 may be coupled to the call controller 214 which, for example, serves as an adapter or interface between the switch and the other routing, monitoring, and communication-handling components of the contact center system 200. The call controller 214 may be configured to process PSTN calls, VoIP calls, etc. For example, the call controller 214 may include computer-telephone integration (CTI) software for interfacing with the switch/media gateway and other components. The call controller 214 may include a session initiation protocol (SIP) server for processing SIP calls. The call controller 214 may also extract data about an incoming interaction, such as the customer's telephone number, IP address, or email address, and then communicate these with other contact center components in processing the interaction.

In regard to the interactive media response (IMR) server 216, it may be configured to enable self-help or virtual assistant functionality. Specifically, the IMR server 216 may be similar to an interactive voice response (IVR) server, except that the IMR server 216 is not restricted to voice and may also cover a variety of media channels. In an example illustrating voice, the IMR server 216 may be configured with an IMR script for querying customers on their needs. For example, a contact center for a bank may tell customers via the IMR script to "press 1" if they wish to retrieve their account balance. Through continued interaction with the IMR server 216, customers may receive service without needing to speak with an agent. The IMR server 216 may also be configured to ascertain why a customer is contacting the contact center so that the communication may be routed to the appropriate resource.

In regard to the routing server 218, it may function to route incoming interactions. For example, once it is determined that an inbound communication should be handled by a human agent, functionality within the routing server 218 may select the most appropriate agent and route the communication thereto. This type of functionality may be referred to as predictive routing. Such agent selection may be based on which available agent is best suited for handling the communication. More specifically, the selection of appropriate agent may be based on a routing strategy or algorithm that is implemented by the routing server 218. In doing this, the routing server 218 may query data that is relevant to the incoming interaction, for example, data relating to the particular customer, available agents, and the type of interaction, which, as described more below, may be stored in particular databases. Once the agent is selected, the routing server 218 may interact with the call controller 214 to route (i.e., connect) the incoming interaction to the corresponding agent device 230. As part of this connection, information about the customer may be provided to the selected agent via their agent device 230. This information is intended to enhance the service the agent is able to provide to the customer.

Regarding data storage, the contact center system 200 may include one or more mass storage devices—represented generally by the storage device 220—for storing data in one or more databases relevant to the functioning of the contact center. For example, the storage device 220 may store customer data that is maintained in a customer database 222. Such customer data may include customer profiles, contact information, service level agreement (SLA), and interaction history (e.g., details of previous interactions with a particular customer, including the nature of previous interactions, disposition data, wait time, handle time, and actions taken by the contact center to resolve customer issues). As another example, the storage device 220 may store agent data in an agent database 223. Agent data maintained by the contact center system 200 may include agent availability and agent profiles, schedules, skills, handle time, etc. As another example, the storage device 220 may store interaction data in an interaction database 224. Interaction data may include data relating to numerous past interactions between customers and contact centers. More generally, it should be understood that, unless otherwise specified, the storage device 220 may be configured to include databases and/or store data related to any of the types of information described herein, with those databases and/or data being accessible to the other modules or servers of the contact center system 200 in ways that facilitate the functionality described herein. For example, the servers or modules of the contact center system 200 may query such databases to retrieve data stored therewithin or transmit data thereto for storage.

In regard to the stat server 226, it may be configured to record and aggregate data relating to the performance and operational aspects of the contact center system 200. Such information may be compiled by the stat server 226 and made available to other servers and modules, such as the reporting server 248, which then may use the data to produce reports that are used to manage operational aspects of the contact center and execute automated actions in accordance with functionality described herein. Such data may relate to the state of contact center resources, e.g., average wait time, abandonment rate, agent occupancy, and others as functionality described herein would require.

The agent devices 230 of the contact center 200 may be communication devices configured to interact with the various components and modules of the contact center system 200 in ways that facilitate functionality described herein. An agent device 230, for example, may include a telephone adapted for regular telephone calls or VoIP calls. An agent device 230 may further include a computing device configured to communicate with the servers of the contact center system 200, perform data processing associated with operations, and interface with customers via voice, chat, email, and other multimedia communication mechanisms according to functionality described herein. While FIG. 2 shows three such agent devices—i.e., agent devices 230A, 230B and 230C—it should be understood that any number may be present.

In regard to the multimedia/social media server 234, it may be configured to facilitate media interactions (other than voice) with the customer devices 205 and/or the servers 242. Such media interactions may be related, for example, to email, voice mail, chat, video, text-messaging, web, social media, co-browsing, etc. The multi-media/social media server 234 may take the form of any IP router conventional in the art with specialized hardware and software for receiving, processing, and forwarding multi-media events and communications.

In regard to the knowledge management server 234, it may be configured facilitate interactions between customers and the knowledge system 238. In general, the knowledge system 238 may be a computer system capable of receiving questions or queries and providing answers in response. The knowledge system 238 may be included as part of the contact center system 200 or operated remotely by a third party. The knowledge system 238 may include an artificially intelligent computer system capable of answering questions posed in natural language by retrieving information from information sources such as encyclopedias, dictionaries, newswire articles, literary works, or other documents submitted to the knowledge system 238 as reference materials, as is known in the art. As an example, the knowledge system 238 may be embodied as IBM Watson or a like system.

In regard to the chat server 240, it may be configured to conduct, orchestrate, and manage electronic chat communications with customers. In general, the chat server 240 is configured to implement and maintain chat conversations and generate chat transcripts. Such chat communications may be conducted by the chat server 240 in such a way that a customer communicates with automated chatbots, human agents, or both. In exemplary embodiments, the chat server 240 may perform as a chat orchestration server that dispatches chat conversations among the chatbots and available human agents. In such cases, the processing logic of the chat server 240 may be rules driven so to leverage an intelligent workload distribution among available chat resources. The chat server 240 further may implement, manage and facilitate user interfaces (also UIs) associated with the chat feature, including those UIs generated at either the customer device 205 or the agent device 230. The chat server 240 may be configured to transfer chats within a single chat session with a particular customer between automated and human sources such that, for example, a chat session transfers from a chatbot to a human agent or from a human agent to a chatbot. The chat server 240 may also be coupled to the knowledge management server 234 and the knowledge systems 238 for receiving suggestions and answers to queries posed by customers during a chat so that, for example, links to relevant articles can be provided.

In regard to the web servers 242, such servers may be included to provide site hosts for a variety of social interaction sites to which customers subscribe, such as Facebook, Twitter, Instagram, etc. Though depicted as part of the contact center system 200, it should be understood that the web servers 242 may be provided by third parties and/or maintained remotely. The web servers 242 may also provide webpages for the enterprise or organization being supported by the contact center system 200. For example, customers may browse the webpages and receive information about the products and services of a particular enterprise. Within such enterprise webpages, mechanisms may be provided for initiating an interaction with the contact center system 200, for example, via web chat, voice, or email. An example of such a mechanism is a widget, which can be deployed on the webpages or websites hosted on the web servers 242. As used herein, a widget refers to a user interface component that performs a particular function. In some implementations, a widget may include a graphical user interface control that can be overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Some widgets can include corresponding or additional user interfaces and be configured to access a variety of local resources (e.g., a calendar or contact information on the customer device) or remote resources via network (e.g., instant messaging, electronic mail, or social networking updates).

In regard to the interaction (iXn) server 244, it may be configured to manage deferrable activities of the contact center and the routing thereof to human agents for completion. As used herein, deferrable activities include back-office work that can be performed off-line, e.g., responding to emails, attending training, and other activities that do not entail real-time communication with a customer.

In regard to the universal contact server (UCS) 246, it may be configured to retrieve information stored in the customer database 222 and/or transmit information thereto for storage therein. For example, the UCS 246 may be utilized as part of the chat feature to facilitate maintaining a history on how chats with a particular customer were handled, which then may be used as a reference for how future chats should be handled. More generally, the UCS 246 may be configured to facilitate maintaining a history of customer preferences, such as preferred media channels and best times to contact. To do this, the UCS 246 may be configured to identify data pertinent to the interaction history for each customer such as, for example, data related to comments from agents, customer communication history, and the like. Each of these data types then may be stored in the customer database 222 or on other modules and retrieved as functionality described herein requires.

In regard to the reporting server 248, it may be configured to generate reports from data compiled and aggregated by the statistics server 226 or other sources. Such reports may include near real-time reports or historical reports and concern the state of contact center resources and performance characteristics, such as, for example, average wait time, abandonment rate, agent occupancy. The reports may be generated automatically or in response to specific requests from a requestor (e.g., agent, administrator, contact center application, etc.). The reports then may be used toward managing the contact center operations in accordance with functionality described herein.

In regard to the media services server 249, it may be configured to provide audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, keyword spotting, and the like.

In regard to the analytics module 250, it may be configured to provide systems and methods for performing analytics on data received from a plurality of different data sources as functionality described herein may require. In accordance with example embodiments, the analytics module 250 also may generate, update, train, and modify predictors or models 252 based on collected data, such as, for example, customer data, agent data, and interaction data. The models 252 may include behavior models of customers or agents. The behavior models may be used to predict behaviors of, for example, customers or agents, in a variety of situations, thereby allowing embodiments of the present invention to tailor interactions based on such predictions or to allocate resources in preparation for predicted characteristics of future interactions, thereby improving overall contact center performance and the customer experience. It will be appreciated that, while the analytics module 250 is depicted as being part of a contact center, such behavior models also may be implemented on customer systems (or, as also used herein, on the "customer-side" of the interaction) and used for the benefit of customers.

According to exemplary embodiments, the analytics module 250 may have access to the data stored in the storage device 220, including the customer database 222 and agent database 223. The analytics module 250 also may have access to the interaction database 224, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, as discussed below, the analytic module 250 may be configured to retrieve data stored within the storage device 220 for use in developing and training algorithms and models 252, for example, by applying machine learning techniques.

One or more of the included models 252 may be configured to predict customer or agent behavior and/or aspects related to contact center operation and performance. Further, one or more of the models 252 may be used in natural language processing and, for example, include intent recognition and the like. The models 252 may be developed based upon 1) known first principle equations describing a system, 2) data, resulting in an empirical model, or 3) a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, it may be preferable that the models 252 are nonlinear. This is because nonlinear models can represent curved rather than straight-line relationships between manipulated/disturbance variables and controlled variables, which are common to complex systems such as those discussed herein. Given the foregoing requirements, a machine learning or neural network-based approach is presently a preferred embodiment for implementing the models 252. Neural networks, for example, may be developed based upon empirical data using advanced regression algorithms.

The analytics module 250 may further include an optimizer 254. As will be appreciated, an optimizer may be used to minimize a "cost function" subject to a set of constraints, where the cost function is a mathematical representation of desired objectives or system operation. Because the models 252 may be non-linear, the optimizer 254 may be a nonlinear programming optimizer. It is contemplated, however, that the present invention may be implemented by using, individually or in combination, a variety of different types of optimization approaches, including, but not limited to, linear programming, quadratic programming, mixed integer non-linear programming, stochastic programming, global non-linear programming, genetic algorithms, particle/swarm techniques, and the like. The models 252 may include time series forecasting models as described in more detail below.

According to exemplary embodiments, the models 252 and the optimizer 254 may together be used within an optimization system 255. For example, the analytics module 250 may utilize the optimization system 255 as part of an optimization process by which aspects of contact center performance and operation are optimized or, at least, enhanced. This, for example, may include aspects related to the customer experience, agent experience, interaction routing, natural language processing, intent recognition, or other functionality related to automated processes.

The various components, modules, and/or servers of FIG. 2 (as well as the other figures included herein) may each include one or more processors executing computer program instructions and interacting with other system components for performing the various functionalities described herein. Such computer program instructions may be stored in a memory implemented using a standard memory device, such as, for example, a random-access memory (RAM), or stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the present invention. Further, the terms "interaction" and "communication" are used interchangeably, and generally refer to any real-time and non-real-time interaction that uses any communication channel including, without limitation, telephone calls (PSTN or VoIP calls), emails, vmails, video, chat, screen-sharing, text messages, social media messages, WebRTC calls, etc. Access to and control of the components of the contact system 200 may be affected through user interfaces (UIs) which may be generated on the customer devices 205 and/or the agent devices 230. As already noted, the contact center system 200 may operate as a hybrid system in which some or all components are hosted remotely, such as in a cloud-based or cloud computing environment.

Searching and Analytics Related to Conversation Data

The interactions that occur between customers and customer service agents are key to how contact centers deliver services. The manner in which these interactions are conducted provide valuable insights into customer needs and preferences as well as agent performance. Much of the time the natural language conversations occurring within these interactions between customers and agents are transcribed into text and stored for analysis. However, analyzing this textual data can be challenging due to the sheer volume of it. Additionally, many contact center analytics that are essential to operational health depend upon the ability to efficiently search through this type of data to uncover developing trends. Any improvement as to how such searching could be more efficiently implemented would have an outsized beneficial impact on contact center operations.

Generally contact centers search interaction data via a combination of metadata, for example, agent names, date ranges, duration ranges, and events, which is stored in association with the interactions. In addition, contact centers rely on key word searching where particular words or phrases are matched in a target text. This common mode of searching locates guessed snippets of particular words or phrases in the stored text. For example, contact centers may predefine topics that can be searched via a list of associated key words or phrases. Sentiment score, trends, and the other events can be searched in similar ways. Such search techniques are categorized as extractive because they operate on lexical extracts of the text. For example, if it is desired to locate interactions where a customer complains about the quality of shoes they purchased, an extractive query may be fashioned that is intended to align with how such a complaint would likely appear in the target text. In configuring this type of query, a customer would be expected to use language indicating that, for example, the shoes "tore" or "fell apart" or had "smudges", so these words may be included in a list of key words that are used in the search. However, as will be appreciated, the efficacy of this search method generally depends on correctly guessing the language people use to describe particular issues. This is often quite difficult, with even the best phrased searches missing relevant material.

In the present application, a particular search method is proposed for analyzing customer-agent interaction data via what is referred to herein as an abstractive search process. As used herein, abstractive search refers to search using descriptive language. As part of this method, particular types of large language models (or LLMs) are used to answer questions about interactions, with those answers then being used to generate an index that enables a form of abstractive search. There have been recent advances in the domain of LLMs and many that are trained to predict text, which may be known as generative or autoregressive models, are demonstrating interesting emerging capabilities that have not been fully utilized. Certain aspects of the present application involves the harnessing of these new capabilities toward fashioning useful analytic tools for contact centers. As will be seen, the abstractive search of the present application offers several advantages over conventional searching. First, it provides for easier and more intuitive searching. Second, abstractive search produces higher recall, as a single descriptive query may be used to locate many different instances that are relevant to the search. Third, it allows for ad hoc queries, i.e., there is no need for predefined topics or phrases. And finally, fourth, abstractive search provides a significant step toward natural language interaction with contact center data.

As discussed in detail below, systems and methods of the present invention utilize a large language model that is configured to automatically generate concise answers to questions—such as "What was the intent of the customer?", "Why was the customer unhappy?", "What was the customer upset about?", or "What was the resolution of the issue?"—which are posed in association to conversation data derived from an interaction. The answers to these questions can then be used to implement useful contact center analytics. As an example, the answers can be stored alongside the interactions as unstructured fields and enable enhanced keyword searching capabilities. The text of the answers further can be encoded into vector embeddings and indexed. As will be seen, this index may be used for downstream tasks such as semantic searching using the sentence embeddings, generating reports using clustering over sentence embeddings, finding anomalies in near realtime by filtering out "regular" clusters, summarization, and others. In addition, ad hoc questions can be phrased by supervisors, allowing these semantic aggregations to occur around answers to questions that are specific to the relevant industry or line of business.

Figure 3:
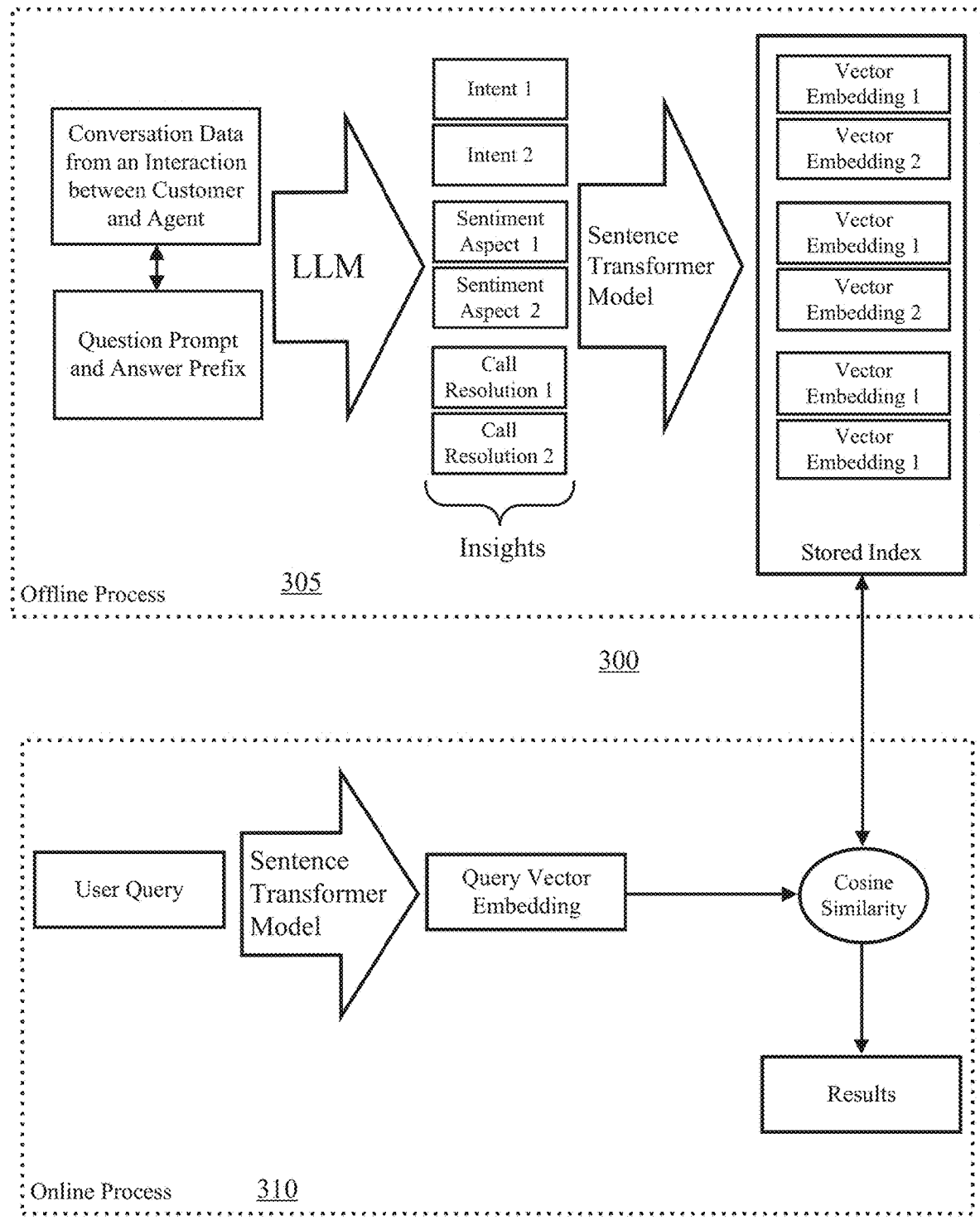
FIG. 3 is a simplified flow diagram of system for generating insights from conversation data and indexing the results for descriptive natural language searching in accordance with embodiments of the present disclosure.

With reference now to FIG. 3, a logic flow diagram 300 is presented in accordance with an exemplary method of the present invention. As shown, in regard to operation, the illustrated method may include two processes. The first of these processes is referred to as an offline indexing process 305, while the second process is referred to as an online searching process 310. As described below, the offline indexing process 305 is configured to generate or build a specific index, while the online searching process 310 is configured to perform a form of descriptive or abstractive search by querying the index.

With specific reference to the offline indexing process 305, exemplary embodiments of the present invention include a method for generating an index with insights derived from conversation data. As will be seen, when generated in accordance with this method, the index is specifically configured so to enable abstractive search and related analytics. The offline indexing process 305 may run in the background, with the index being continually updated with insights derived from the current interactions being handled by the contact center. In one embodiment, as discussed below in regard to FIG. 5, the offline indexing process may include a feedback step where an agent or other user provides feedback in relation to the insights generated.

As an initial step of the offline indexing process 305, particular types of data are gathered as input. As illustrated, this may include interaction data that is derived from the interactions between customers and agents. Such interactions may be recorded as they occur and stored. As will be appreciated, conventional contact centers perform this sort of large scale interaction data collection as a normal part of operations. The interaction data may be gathered from interactions occurring within one or more contact centers. The interaction data may include conversation data. Conversations data is data related to a conversation that occurs between an agent and customer. A conversation is a natural language exchange having multiple back and forth turns between an agent and customer over the course of an interaction. Conversations, for example, may occur via a text interface, such as via a chat or messaging application. Conversations also may occur via a voice interface, such as via a telephone call or as part of a video conference. In the case of voice interface, the voice of the customer and agent may be recorded and then transcribed into text. This functionality is already performed at large scale in contact centers, with the transcribing of voice interactions being done automatically via a speech-to-text engine.

As indicated in the referenced figure, the conversation data from a particular interaction may be provided as an input for a large language model along with particular a particular question prompt and answer prefix. The question prompt also may be referred to as an encoder prompt, while the answer prefix also may be referred to as a decoder prompt. As used herein, a large language model or LLM is a type of artificial intelligence (AI) algorithm that uses deep learning techniques and massively large data sets to understand, summarize, generate and predict new content. The LLM may be one that is trained to take in text as an input and produce text as an output. Preferably, the LLM is trained and finetuned on specifical question answering and summarization style of text-to-text.

In accordance with certain embodiments, the LLM of the present invention is a language model having at least 1 billion parameters. Alternatively, the LLM may have at least 3 billion parameters. In other cases, the LLM of the present invention has at least 7 billion parameters. The LLM of the present invention may be constructed using the known transformer architecture, as either a decoder-only or encoder-decoder. The LLM may be trained using unsupervised data scrapped from the internet, with the objective of predicting the next word given all previous words in the context. The unsupervised data, for example, may be gathered from a wide range of sources, such as, Reddit chats, Wikipedia articles, books, etc. Such language models may have a limited context window, for example, 2048 tokens. If the text exceeds this limit, then only the last 2048 tokens are considered by the neural network model.

For example, an LLM that may be used in this step is the T0++ (or T0PP) model. The T0PP model is an open source encoder-decoder LLM with a neural network having over eleven billion parameters. Other exemplary LLMs that could be used as part of the functioning of the present invention include other open source models as well as closed models. Llama 2 (a decoder-only model developed by Meta/Facebook), BTLM (developed by Cerebras), Pythia (developed by EleutherAI), and MPT (developed by Mosaiclm). Each of these models has between 1-7 billion parameters. In accordance with exemplary embodiments, the process of the present invention may include using an open source model, such as those identified, that is then further trained or finetuned on contact center data, for example, text from agent-customer interactions. Such LLMs can be trained pursuant to contact center data derived from within particular industries, companies, or other particularly defined contexts. Some examples of closed models that can be used with the present invention include GPT-3.5/4 (developed by OpenAI/Microsoft Azure), Claude (developed by Anthropic through Amazon Bedrock). While such close models typically cannot be further trained on a developer's own data, such models can be trained or finetuned on quantities of synthetic data that is provided by the model's developer. Other similar LLMs to those discussed above may also be used.

Continuing with the discussion as to how the present invention operates, the conversation data—for example, text derived from an interaction—may be fed into the LLM along with the question prompt/answer prefix asking the LLM to generate an insight. As will be discussed in more detail below, the nature of the question prompt and the answer prefix depends upon the insight being sought from the given interaction, with exemplary embodiments being fashioned around obtaining several types of insights from the conversation data, including insights relating to customer intent, sentiment-aspect, call or interaction resolution, as well as others. For example, when the insight is understanding the intent of the customer, a question prompt for determining this may be "What is the intent of the customer?" while the related answer prefix may be "The intent of the customer is . . . ". In regard to sentiment-aspect, for example, the question prompt may be "Why is the customer upset?" while the answer prefix may be "The customer is upset because . . . ". And, in regard to interaction resolution, for example, the question prompt may be "How was the customer support conversation resolved?" while the answer prefix may be "The customer support conversation was resolved by . . . ".

As a next step, the LLM generates text as an output given the described inputs. This output may also be referred to as an insight. To do this, the LLM is asked to answer the question posed by the question prompt given the input conversation data from the interaction and the answer prefix. So, for example, the LLM is asked to generate a reason as to why the customer is upset, or what is the customer's intent, or how the conversation was resolved, which is represented in the figure by the different type of "insights" listed on the downstream side of the LLM. Generally, in regard to customer intent and interaction resolution there is a single answer generated by the LLM per interaction, but there also may be secondary intents and secondary interaction resolutions in a given interaction, which is a possibility covered in the insights with the inclusion of the second intent and interaction resolution. This is also shown with regard to the insight of sentiment-aspect, as it is not unusual for there to be more than one reason as to why a customer is upset. In such cases, the LLM may be asked to generate several reasons as to why the customer is upset, thereby generating several answers in this category of insight. It should be understood that more than two insights per insight category may also be recorded. Further, it should be understood that the several types of insights listed in the referenced figure are intended as exemplary. Generating each type of insight generally requires emphasis on particular portions of the conversation data and necessitates different question prompts and answer prefixes specific to a given insight, as discussed more below.

In regard to generating more than one intent, interaction resolution, sentiment-aspect or other insight for a given interaction, one way that this may be achieved is by using different phrasing for the question prompt and answer prefixes. Even question prompts and answer prefixes that are semantically very similar but phrased differently may cause the LLM to generate different answers. So, different phrasing of the prompts/prefixes may be used to generate alternatives for the same insight. Such alternatives may be used as part of a feedback user interface to derive at the most accurate answer, which will be discussed more below in relation to FIG. 5. For sentiment-aspect, different responses from the LLM may be provoked using word restrictions based on previous responses from the LLM.

The answers or insights generated by the LLM may be stored in association with the interaction as an unstructured field for later text searches. In such cases, the generated insight may be stored in conjunction with the answer prefix so that the information stored constitutes a complete statement, for example, when the answer prefix is "The customer is upset because . . . " and the generated insight is " . . . a shipping delay" the statement that is stored may be "The customer is upset because of a shipping delay."

As indicated in the referenced figure, the next step in the offline indexing process 305 may include transforming the generated insight into a vector embedding. In natural language processing (NLP), a vector embedding, which also may be referred to simply as a embedding or vector, is a representation of a word or phrase or sentence. Typically, the representation is a real valued vector that encodes the meaning of the word in such a way that words that are closer in the vector space are expected to be similar in meaning. Such embeddings can be obtained using language modeling and feature learning techniques, where words or phrases from the vocabulary are mapped to vectors of real numbers. This functionality may be achieved via the use of a sentence transformer, such as a neural network sentence transformer, that is configured to take the insight as an input and generate a representative vector embedding in relation thereto. In exemplary embodiments, the sentence transformer may be an embeddings language model. An embeddings language-model is specialized in taking a phrase or sentence as an input and computing a representative vector embedding, with the objective being to capture inside the computed vector embedding the semantic meaning of the sentence. Such neural network language models may be trained, for example, on via contrastive learning where the training data includes a triplet of sentences with two being tagged as being similar and one tagged as being not similar. As an example, an embedding language model such as MPNet may be employed in this step of the process. Other similar models may also be used for this step in the process. Accordingly, in exemplary embodiments, the sentence transformer of the present invention may be a package of pretrained neural networks that is configured to encode sentences into an embedding (vector of numbers of some large size, e.g., 1024). As will be appreciated, once encoded, such vectors have the property that semantically similar sentences produce vectors that have high cosine similarity (dot product), while semantically dissimilar have low cosine similarity score.

With the vector embedding generated, a final step of the offline indexing process 305 includes storing the vector embeddings in an index that enables efficient searching. As an example, an open source system such as Faiss may be used to do this. In such an indexing system, the vector embeddings are indexed so that the stored vectors most similar to a submitted query vector can be quickly identified. The index may also associate the stored vector embedding with the interaction from which it was derived so that other data stored in association with the interaction may be recalled as needed.

In addition, a clustering algorithm may be used in relation to the vector embeddings stored in the index to enable other analytics. The collection of insights in the index may include several different insight types, including intents, sentiment-aspects, interaction resolutions, and others. Within each of the types, a clustering algorithm may be used to identify aggregations or clusters occurring within each. That is, with intents, sentiment-aspects, action items, etc. being stored as both unstructured fields and as vector embeddings, aggregations over each of the different insight types may be done via a clustering algorithm so to identify the similar clusters occurring within each. As will be appreciated, given the nature of the index, the clusters denote a degree of semantic similarity. The clustering algorithm known as DBscan is an example of a clustering algorithm that could be used to complete this step. The results of the clustering can be used to produce reports on the clusters, including the size of the clusters, predominance in comparison to other clusters, as well as how these evolve over time. The results may be used to spot outliers and anomalies.

As an example, let's consider how clustering may treat the following list of sentiment-aspects:
  "The customer is upset because his shoes didn't arrive yet."
  "The customer is upset because the shoes came with smudges."
  "The customer is upset because the package is delayed."
  "The customer is upset because the package was lost in transit."
  "The customer is upset because laces of the shoe were frayed."
  "The customer is upset because the buckle on the shoes broke."

After semantic clustering using the vector embeddings and cosine similarity as the distance function, it is likely that two distinct clusters are found. A first cluster would relate to "Shipping Issues", while a second cluster would relate to "Product Quality". Additionally, the LLM may also be used to generate a name for the clusters. For example, a name can be generated for each of the clusters by concatenating, for example, 10 aspects in each cluster and then asking the LLM to generate a common name with the following instruction: "Generate a category name for the given reasons of dissatisfaction". The generated name may then be shown in the aggregation report, together with a percentage that signifies that fraction of interactions that contained these sentiment-aspects. In this way, a contact center supervisor is able to know in realtime the top reasons for customer dissatisfaction in the contact center. The same type of analysis can be produced for every other insight such as intent and interaction resolutions.

Turning now to the online searching process 310, according to exemplary embodiments, the invention of the present application includes a method for a user to search the index generated by the offline indexing process 305. The online searching process 310 may begin with the user inputting a natural language query. Such a query may be submitted by the user via natural descriptive language describing an insight—e.g., an intent, sentiment-aspect, or interaction resolution—that is the intended subject of the search. For example, in regard to a query intended to search for interactions having a particular sentiment-aspect, the query may simply be a natural language input stating, for example, "the customer is upset due to high price" or "the customer is frustrated due to bad assembly instructions" or "the customer is not happy because of low quality" or "the customer is angry due to a rude agent".

As a next step in the online searching process 310, the user query is used as an input to the sentence transformer. The sentence transformer may function the same as described above in relation to the offline indexing process. That is, the sentence transformer may generate a representative vector embedding that captures inside the computed vector the semantic meaning of the query. The vector embedding that is generated for the query is then used to search the stored index. In accordance with an exemplary embodiment, this search may be done by calculating a similarity, for example, cosine similarity, that compares the vector embedding of the query (or "query vector embedding") and each of the stored vector embeddings. That is, the vector embedding of the query is compared mathematically to each of the stored vector embeddings to compute a similarity score that indicates a degree to which each given pair is semantically similar. For example, the similarity score may have a range between 0 and 1, with 0 being perfectly dissimilar and 1 being perfectly similar. A predefined similarity threshold may be provided so that each comparison yielding a similarity that is less than the threshold is discarded while the comparisons producing a similarity score above the threshold are provided as the results of the search. The results may be sorted and presented to the user via descending similarity score.

Figure 4:
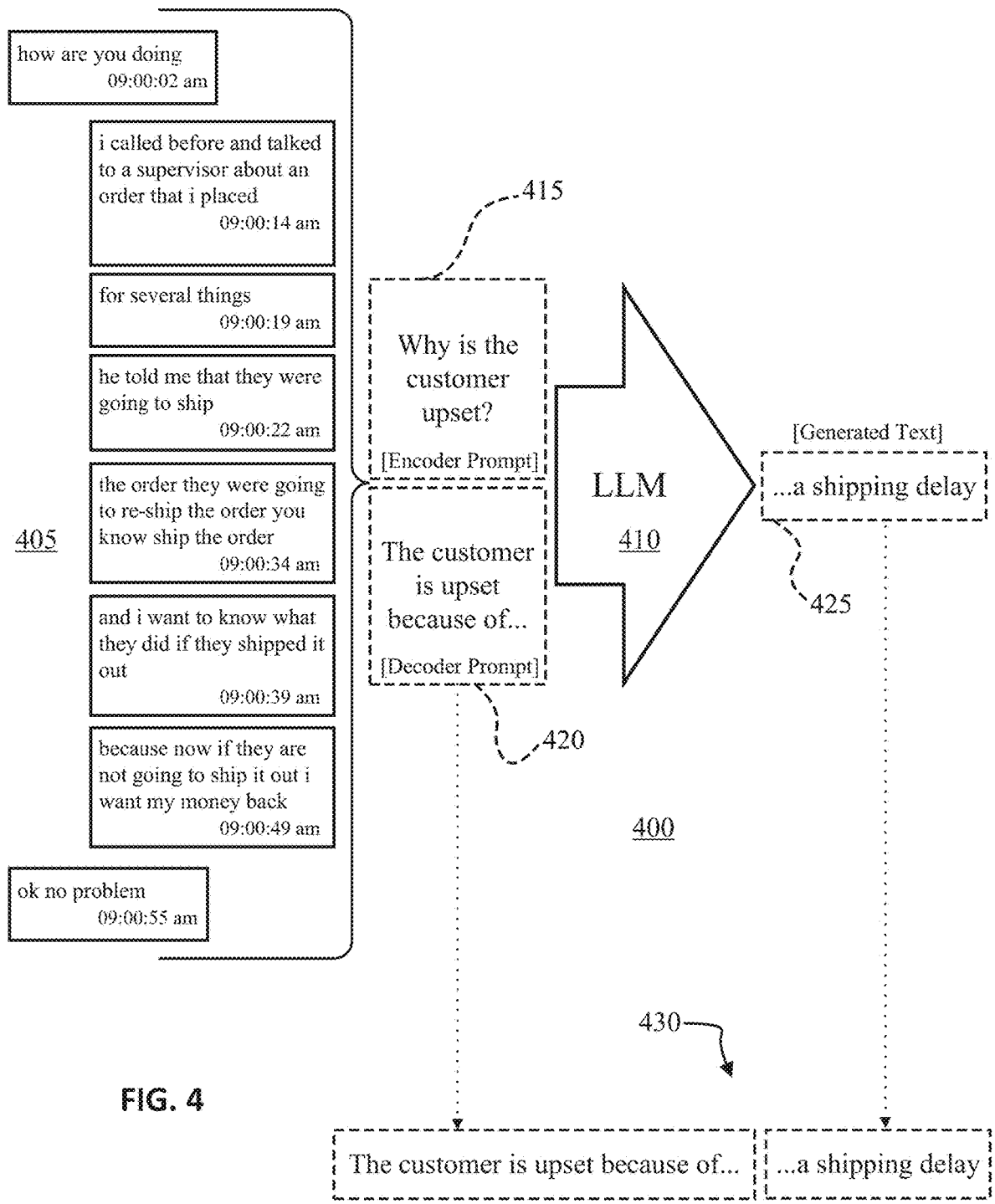
FIG. 4 is a simplified flow diagram demonstrating an exemplary operation of the system of FIG. 3 in accordance with embodiments of the present disclosure.

With reference now to FIG. 4, an example diagram 400 is provided that demonstrates further aspects as to how the process of the present application generates a particular insight. The illustrated example represents an actual result achieved with the given inputs. On the left of the referenced figure, conversation data is shown that relates to a portion of a conversation (or "conversation portion") 405 that is derived from an interaction between a contact center agent and a customer. The conversation portion 405 is provided via several dialogue blocks that are filled with text as transcribed from the conversation. The conversation portion 405 begins with a dialogue block in which the agent says, "How are you doing?". In the next several blocks, the customer proceeds with describing the reason for the call: "I called before and talked to a supervisor about an order that I placed . . . for several things . . . he told me that they were going to ship . . . the order they were going to reship the order you know ship the order . . . and I want to know what they did if they shipped it out . . . because now if they are not going to ship it out I want my money back." In the final dialogue block, the agent replies, "Ok no problem."

In accordance with exemplary embodiments, the conversation portion 405 may be a portion of the conversation that is identified as being relevant to a particular insight, which in this case is the insight of sentiment-aspect. Such identified relevancy of a portion of the conversation could stem from a determination that the customer expressed a negative sentiment within the portion. For example, in the case depicted, the determined negative sentiment is the final customer utterance of "I want my money back". The relevant conversation portion may then be defined as the negative sentiment and a predefined extent of the text surrounding the negative sentiment, as discussed more below. As will be seen, the identification of relevant portions within a complete conversations for analysis for particular insights can increase analytic efficiency. Further, as discussed in detail below, the manner in which relevant conversation portions are identified may vary depending upon the type of insight being analyzed.

The next step in the process is to provide the conversation portion 405 an input to a LLM 410 along with a question prompt 415 and answer prefix 420 (or encoder prompt and decoder prompt, respectively). As illustrated, with the insight being sentiment-aspect, the question prompt is framed as "Why is the customer upset?" and the answer prefix is framed as "The customer is upset because of . . . ". As will be appreciated, the answer prefix basically informs the LLM as to the desired form of the answer that it generates. Given the inputs, the LLM then generates text that answers the question prompt in a form that completes the answer prefix. Thereby, a statement 430 is provided answering the question posed by the question prompt. In this case, the LLM generates " . . . a shipping delay" so to provide the statement 430 of "The customer is upset because of a shipping delay" as the answer.

In summary, as will be appreciated, the LLM is provided transcribed text from a natural language conversation as an input. The transcribed text may relate to a particular portion of the conversation that occurs within an interaction with that portion being identified as relevant to a desired insight. The LLM is further asked a question via a question prompt about the transcribed text with the answer being conditioned in accordance with an answer prefix. The LLM then generates text that answers the question in a form conditioned by the answer prefix. In this case, as shown, the text generated by the LLM correctly identified the reason for the negative sentiment.

Attention will now turn to particular applications and how the present methods is applied to generate particular insights. The first of these insights is sentiment-aspect, which is the subject of the figure discussed above. Broadly, sentiment-aspect refers to the reason for the sentiment expressed by the customer. Accordingly, if the customer is upset, the sentiment-aspect is the reason as to why the customer is upset. An advantage of feature or aspect based sentiment analysis is the possibility to capture further information regarding reasons for the customers expression of sentiment, i.e., why the customer is unhappy or upset.

In accordance with exemplary embodiments, sentiment-aspect analysis may be performed in relation to portions of a conversation that are identified as being relevant to this particular insight. To identify such portions, the process of the present disclosure may include first performing sentiment analysis. Such a process may begin with importing conversational data derived from a particular interaction. As before, conversation data may include transcribed text of a complete conversation that occurred between an agent and customer during a given interaction. Sentiment analysis may then be performed on the transcribed text. As will be understood, sentiment analysis is an analytic process whereby text is analyzed to determine if the emotional tone of the message is positive, negative, or neutral. For example, sentiment analysis may be done using a pretrained classifier that classifies each utterance as one of: negative/positive/neutral. In exemplary embodiments, the pretrained classifier may be a neural network that is first pretrained in an unsupervised manner on vast amounts of general text, which may be scrapped from the internet as described above from a range of sources. The pretrained classifier may be fine-tuned for the specific classification task, which in this case is classifying an utterance as one having a negative, positive, or neutral sentiment. For example, this training may be done using supervised (manually annotated) data. As an example, the Roberta model could be used as the pretrained classifier. The Roberta model is a neural network that uses the known transformer architecture with attention heads. As another example, a neural network known as XLMR may be used as a pretrained classifier. The XLMR model is similar to Roberta but has the advantage of being multilingual, i.e., the model is trained on many languages.

The results of the sentiment analysis, thus, identifies instances where the customer made a negative utterance. A conversation portion may then be created in relation to each identified negative utterance. In accordance with exemplary embodiments, a rule may be used to define a conversation portion as including a predetermined range of utterances made around the negative utterance, for example, a predetermined number of utterances made before the negative utterance (e.g., between 10 to 20 utterances before) and a predetermined number of utterances made after the negative utterance (e.g., between 5 to 10 after), where each line starts with customer/agent notation. For example, the following conversation portion is an example of one that is created around the identified negative utterance made by the customer regarding wanting his money back. Note the text is in a raw format as does not include capitalization or punctuation:

Customer: i have been waiting on these shoes for almost three weeks now and i still don't have them the shoes are probably still in some warehouse somewhere Agent: i understand your frustration i believe there has been some delays due to the weather Customer: i don't really care about the weather i mean i know you don't control the weather but neither do i it's not my fault that I haven't got the shoes yet Agent: of course not i can make sure that the shoes are shipped as soon as possible Customer: yeah sorry at this point i want my money back Agent: i understand if you could just give me the order number and your name i can certainly help you with that Customer: ok that would be great the order number is five five nine two one zero and my name is john smith From there, the process may continue by appending the question prompt and answer prefix that apply in this context. For example, the following may be used:

Question Prompt: "What is the reason for customer's dissatisfaction?"

Answer Prefix: "The customer is dissatisfied because . . . "

The LLM is then used to generate a reason as to why the customer is upset, i.e., an answer to the above question prompt, given the described inputs. In some cases, there may be multiple reasons for negativity. In such cases, the LLM may be asked to generate several reasons as to why the customer is dissatisfied, thereby generating several answers.

Turning to the insight of generating an intent for a customer, while the analytic process is similar, some modifications are required as to how the relevant conversation portion is identified upon which the analysis is performed. In this case, instead of defining the relevant conversation portion by first identifying a negative utterance, a rule may be used whereby the first portion of the conversation is targeted, as it is here where intent is most likely expressed. The relevant conversation portion, thus, may be defined by a predetermined number of utterances occurring at the beginning of the conversation. For example, the relevant conversation portion for determining customer intent may be defined as the first 20 to 30 utterances that occur within the conversation. Once these utterances are extracted, they may then be examined using the following exemplary question prompt and answer prefix:

Question Prompt: "What is the intent of the customer?"
Answer Index: "The intent of the customer is . . . "

A process similar to that may be performed with regard to generating a interaction resolution insight. In this case, however, interaction resolution is more likely to occur at the end of a conversation. So, instead of defining the relevant conversation portion as a predetermined number of utterances occurring at the beginning of the conversation, in this case it is defined by a predetermined number of utterances occurring at the end of the conversation. For example, the relevant conversation portion for determining interaction resolution may be the final 20 to 30 utterances occurring within the conversation. Those utterances may then be examined using the following example question prompt and answer prefix:

Question Prompt: "How was the customer's problem resolved?"
Answer Index: "The customer's problem was resolved by . . . "

Another insight that the present invention may generate is extracting action items. In such cases, an action item classifier may be used that classifies each utterance as one that either contains action items or doesn't contain action items. Alternatively, a topic spotting algorithm may be employed which uses either a lexical method or semantic similarity algorithm that takes reference sentences and tries to find similar sentences/phrases in the utterances. After obtaining utterances that were predicted to contain action items, the process may then proceed similarly as to how sentiment-aspects are extracted. For example, a rule may be used to define a relevant conversation portion as including a predetermined range of utterances made around the action time utterance. This range may include a predetermined number of utterances made before the action item utterance (e.g., between 10 to 20 utterances before) and a predetermined number of utterances made after the action item utterance (e.g., between 5 to 10 after). Each line within the conversation portion may begin with a customer/agent notation denoting the speaker.

The present invention may further include a method for anomaly detection. For example, given a new interaction, the generated intent may be compared to each of the main intent clusters by using semantic similarity with the elements in each cluster. Alternatively, the LLM can be asked if the generated intent should be categorized as one of the accumulated intent cluster names. If it is determined that the generated intent is not similar to one of the clusters, the intent can be classified as a possible anomaly, or candidate anomaly. With this designation, the intent can then be communicated to a supervisor, who may confirm whether it should be characterized as an actual anomaly or a false alarm. In this way, new customer issues can be identified quickly.

Figure 5:
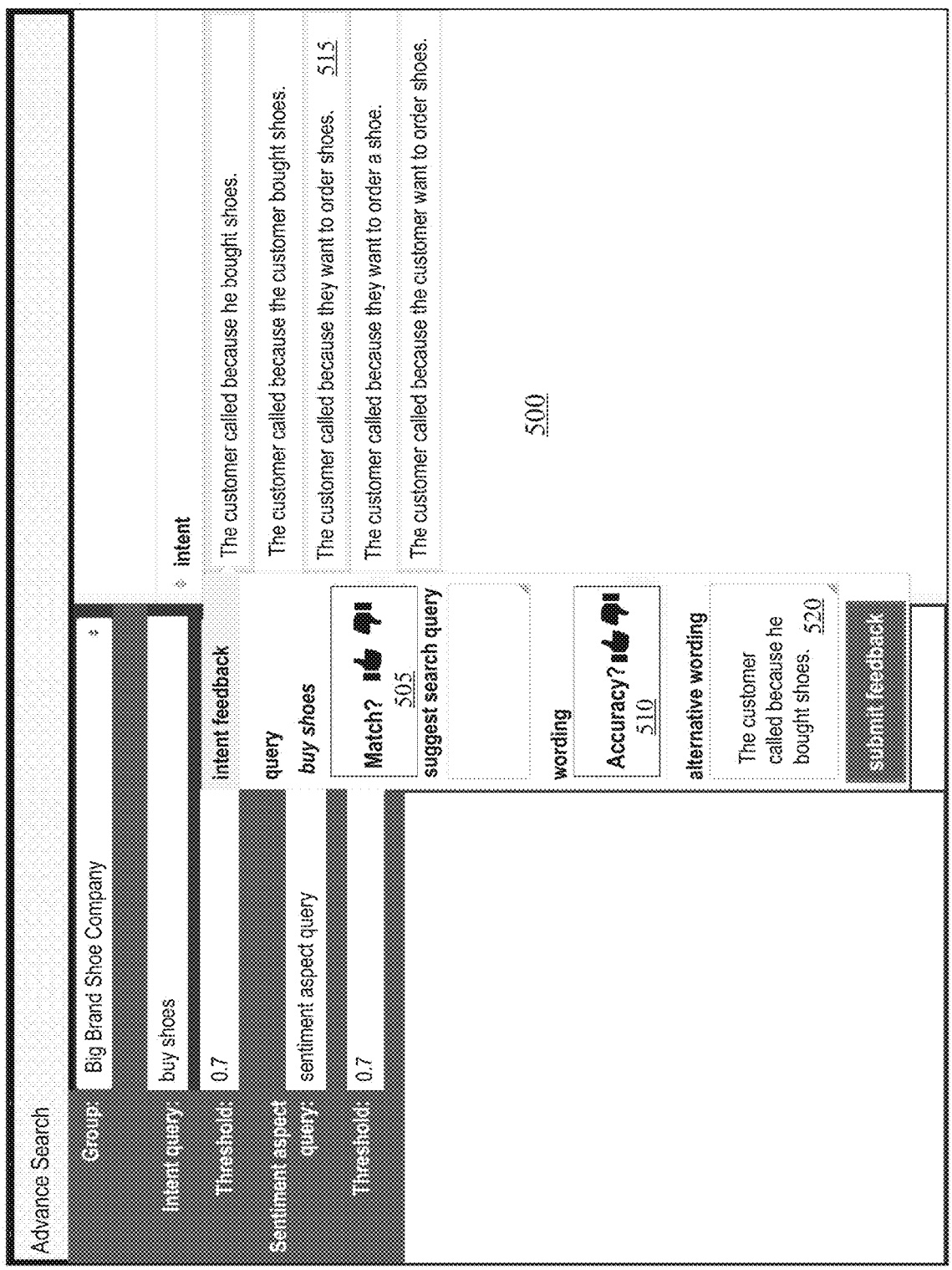
FIG. 5 is a feedback user interface in accordance with embodiments of the present disclosure.

With reference now to FIG. 5, an exemplary user interface 500 for providing feedback is shown in accordance with embodiments of the present invention. As will be appreciated, the functionality associated with this type of interface may serve several purposes. First, the feedback received from the agent may be used to train the LLM for improving future responses. Second, feedback from the agent may be received in realtime while the agent completes tasks associated with an interaction—either as the interaction is ongoing or as part of the wrapup work that is completed by an agent just after the interaction ends—and assist the agent in completing these tasks. For example, agents, as part of their usual tasks associated with each interaction, may be asked to describe the customer's intent, instances of customer dissatisfaction, how the call was resolved, etc. The user interface 500 may serve as a way for generated insights from an interaction to be communicated to an agent and then provide a way for the agent to simply select the most accurate from among proposed alternatives or conveniently edit a proposed insight.

Thus, for example, a selection icon, such as thumbs up/thumbs down selection icons 505, may be presented allowing the agent to indicate as to whether a match between the automatically generated intent and the actual intent of the customer is accurate. Similarly, a thumbs up/thumbs down selection icons 510 can be presented that allow the agent to indicated whether the wording of the automatically generated intent is accurate or not. Additionally, several candidate intents 515 can be generated that allows the agent to select the best one. An alternate wording input 520 may also be provided that allows the agent to either input a completely new entry or edit one of the generated alternatives. Once the agent makes their selections, the resulting insights may be stored as part of the interaction data for the given interaction. The feedback may also be used to train the model.

Alternatively, the same type of user interface may be used by a user that did not participate in the interaction, for example, as a way to provide efficient feedback to the model. In such cases, the user would be presented with a transcript of the conversation data as well as the generated insights. In regard to customer intent, the user can read the beginning of the interaction, gain an understanding of the customer intents, and then, using the tools associated with the user interface 500, provide a more accurate version of an intent or approve the one that was generated. In the suggested search query input, a user is allowed to provide examples of search queries that would be a good match for the specific automatically generated intent. For example, a user could suggest "buy sneakers".

Figure 6:
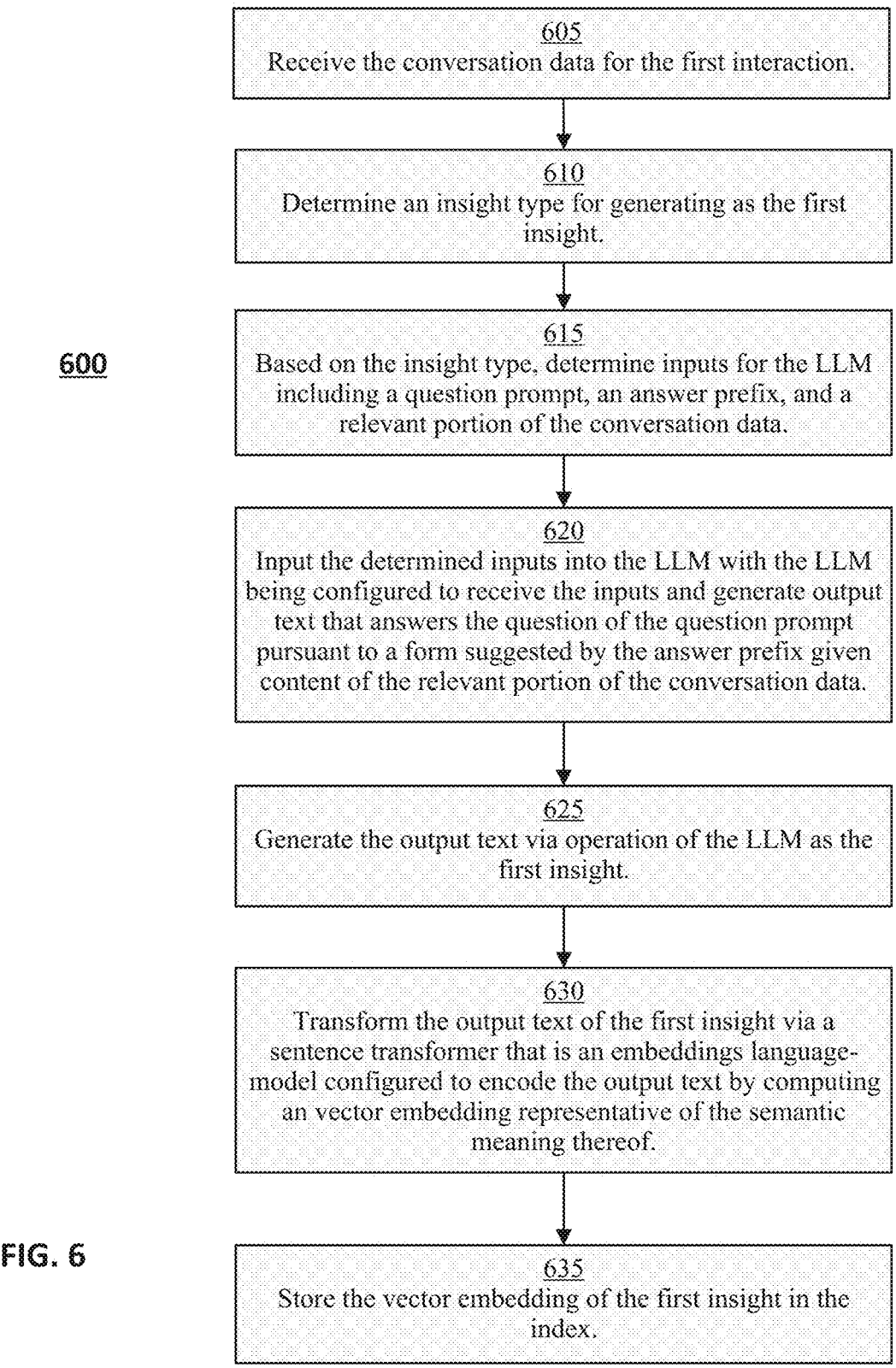
FIG. 6 is an exemplary method of the offline indexing process of FIG. 3 in accordance with embodiments of the present disclosure.

With reference now to FIG. 6, an exemplary method 600 is shown that demonstrate an embodiment of the offline indexing process introduced in FIG. 3. As described, the method 600 may facilitate contact center analytics related to descriptive or abstractive search by generating insights from conversation data derived from interactions handled by the contact center. The insights may then be transformed into a vector embedding that is stored in an index that enables abstractive search. The conversation data for a given interaction may include the text of a natural language conversation that occurred between an agent of the contact center and a customer during the given interaction. The method 600 is described in relation to an exemplary "first interaction" from which a "first insight" is generated. However, it will be appreciated that the method may be repeated in relation to a multitude of interactions so that the resulting index stores a large number of such insights. The method 600 begins, at step 605, where conversation data derived from the first interaction is received.

At step 610, the method 600 continues by determining an insight type for generating as the first insight. This step refers to the type of insight that is being generated via the operation of the method. For example, the insight type may be an insight relating to customer intent, interaction resolution, sentiment-aspect, etc. More than a single insight may be generated from an interaction.

At step 615, the method 600 continues by determining inputs that are provided to the LLM. As described above, such inputs may include a question prompt, an answer prefix, and a relevant portion of the conversation data of the first interaction. The form that these inputs take depends upon the insight type that is determined in the previous step.

At step 620, the method 600 continues by inputting the determined inputs into a large language model (LLM). As described above, the LLM may be a model configured to receive the inputs and generate output text. The output text may answer the question posed in the question prompt pursuant to an answer form suggested by the answer prefix given content contained in the relevant portion of the conversation data of the first interaction.

At step 625, the method 600 continues by generating the output text via operation of the LLM given the inputs. As will be appreciated, the generated output text becomes the first insight.

At step 630, the method 600 continues by transforming the output text of the first insight via a sentence transformer. The sentence transformer may be an embeddings language-model that is configured to transform the output text by computing or encoding a vector embedding representative of a semantic meaning of the output text.

At step 635, the method 600 continues by storing the computed vector embedding of the first insight in the index.

Figure 7:
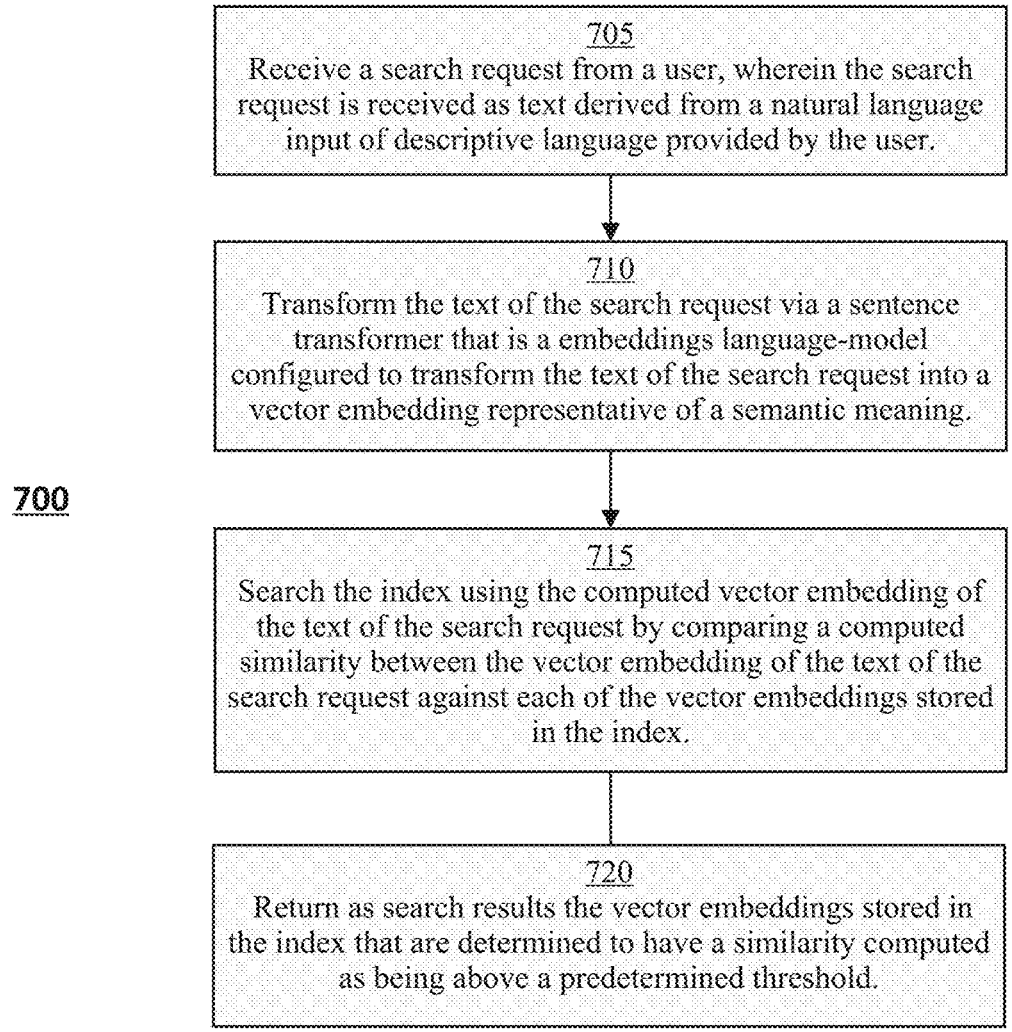
FIG. 7 is an exemplary method of the online searching process of FIG. 3 in accordance with embodiments of the present disclosure.

With reference now to FIG. 7, an exemplary method 700 is shown that demonstrate an embodiment of the online searching process introduced in FIG. 3. The online searching process provides a way for performing an abstractive search of the index created via the offline indexing process.

The method 700 begins, at step 705, by receiving a search request from a user. The search is received as text derived from a natural language input of descriptive language provided by the user. At step 710, the method 700 continues by transforming the text of the search request via a sentence transformer. As with the method 600, the sentence transformer may be an embeddings language-model configured to transform the text of the search request by computing a vector embedding representative of a semantic meaning of the text of the search request.

At step 715, the method 700 continues by searching the index using the computed vector embedding of the text of the search request by comparing a computed similarity between the vector embedding of the text of the search request against each of the vector embeddings stored in the index. At step 720, the method 700 returns as search results the vector embeddings stored in the index having a similarity computed as being above a predetermined threshold.

As one of skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, each of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the present application as defined by the following claims and the equivalents thereof.

That which is claimed:

1. A computer-implemented method for facilitating contact center analytics related to abstractive search, wherein the method includes an offline indexing process for generating insights from conversation data derived from interactions of the contact center and storing the generated insights in an index that enables abstractive search, wherein the conversation data for a given interaction comprising text of a natural language conversation occurring between an agent of the contact center and a customer during the given interaction, and wherein, when described in relation to an exemplary first interaction of the interactions from which a first insight of the insights is generated, the offline indexing process comprises the steps of:
  receiving the conversation data for the first interaction;
  determining an insight type for generating as the first insight;
  based on the insight type, determining inputs, the inputs including:
    a question prompt;
    an answer prefix; and
    a relevant portion of the conversation data;
  inputting the determined inputs into a large language model (LLM), wherein the LLM is configured to receive the inputs and generate output text answering a question contained in the question prompt pursuant to an answer form suggested by the answer prefix given content contained in the relevant portion of the conversation data of the first interaction;
  generating the output text via operation of the LLM, the generated output text comprising the first insight;
  transforming the output text of the first insight via a sentence transformer, wherein the sentence transformer comprises an embeddings language-model configured to transform the output text by computing a vector embedding representative of a semantic meaning of the output text; and
  storing the computed vector embedding of the first insight in the index.

2. The method of claim 1, further comprising an online searching process for executing an abstractive search of the index, the online searching process comprising:
  receiving a search request from a user, wherein the search request comprises text derived from a natural language input from the user of descriptive language;
  transforming the text of the search request via a sentence transformer, wherein the sentence transformer comprises an embeddings language-model configured to transform the text of the search request by computing a vector embedding representative of a semantic meaning of the text of the search request; and searching the index using the computed vector embedding of the text of the search request by comparing a computed similarity between the vector embedding of the text of the search request against each of the vector embeddings stored in the index and returning as search results ones of the vector embeddings stored in the index having a similarity computed as being above a predetermined threshold.

3. The method of claim 2, wherein the computed similarity comprises a cosine similarity.

4. The method of claim 2, wherein the LLM comprises a neural network model having at least 1 billion parameters that is configured to take in text as an input and produce text as an output.

5. The method of claim 2, wherein the LLM comprises a neural network model having at least 3 billion parameters that is configured to take in text as an input and produce text as an output; and wherein the LLM comprises an open source LLM;

further comprising the step of providing refinement training to the LLM pursuant to a historical dataset of the contact center, the historical dataset comprising conversation data derived from interactions previously handled by the contact center.

6. The method of claim 2, wherein the insight type determined for the first insight comprises a sentiment-aspect;

wherein the step of determining the relevant portion of the conversation data of the first interaction comprises:

performing, using a pretrained classifier model, sentiment analysis on the conversation data of the first interaction, the pretrained classifier model comprising a neural network configured to classify utterances as being a positive utterance, negative utterance, or neutral utterance;

identifying, via the sentiment analysis, an utterance made by the customer that is classified as a negative utterance;

determining the relevant portion of the conversation data in relation to the negative utterance by defining the relevant portion of the conversation data as including the negative utterance, a predetermined number of utterances occurring just prior to the negative utterance, and a predetermined number of utterances occurring just after the negative utterance.

7. The method of claim 2, wherein the insight type determined for the first insight comprises an intent of the customer;

wherein the step of determining the relevant portion of the conversation data of the first interaction comprises determining that the relevant conversation portion comprises a predetermined number of utterances occurring at a beginning of the conversation data of the first interaction.

8. The method of claim 2, wherein the insight type determined for the first insight comprises an interaction resolution;

wherein the step of determining the relevant portion of the conversation data of the first interaction comprises determining that the relevant conversation portion comprises a predetermined number of utterances occurring at an end of the conversation data of the first interaction.

9. The method of claim 2, wherein the computed similarity comprises a cosine similarity; and wherein the embeddings language-model of the sentence transformer comprises a pretrained neural networks configured to encode sentences into embedding vectors such that, once encoded, the embedding vectors of semantically similar sentences comprise a cosine similarity that is greater than a cosine similarity of the embedding vectors from semantically dissimilar sentences.

10. The method of claim 2, further comprising storing the generated output text as metadata associated with the first interaction for keyword searching related thereto.

11. The method of claim 2, further comprising using a clustering algorithm to identify clusters of the embeddings vectors occurring within the index having a predetermined degree of semantic similarity.

12. A system for facilitating contact center analytics related to abstractive search, the system comprising:

a processor; and a memory storing instructions which, when executed by the processor, cause the processor to perform an offline indexing process for generating insights from conversation data derived from interactions of the contact center and storing the generated insights in an index that enables abstractive search, wherein the conversation data for a given interaction comprising text of a natural language conversation occurring between an agent of the contact center and a customer during the given interaction, and wherein, when described in relation to an exemplary first interaction of the interactions from which a first insight of the insights is generated, the offline indexing process includes the steps of:

receiving the conversation data for the first interaction;

determining an insight type for generating as the first insight;

based on the insight type, determining inputs, the inputs including:

a question prompt;

an answer prefix; and a relevant portion of the conversation data;

inputting the determined inputs into a large language model (LLM), wherein the LLM is configured to receive the inputs and generate output text answering a question contained in the question prompt pursuant to an answer form suggested by the answer prefix given content contained in the relevant portion of the conversation data of the first interaction;

generating the output text via operation of the LLM, the generated output text comprising the first insight;

transforming the output text of the first insight via a sentence transformer, wherein the sentence transformer comprises an embeddings language-model configured to transform the output text by computing a vector embedding representative of a semantic meaning of the output text; and storing the computed vector embedding of the first insight in the index.

13. The system of claim 12, wherein the memory stores further instructions that, when executed by the processor, cause the processor to perform an online searching process for executing an abstractive search of the index, wherein the online searching process comprises the steps of:

receiving a search request from a user, wherein the search request comprises text derived from a natural language input from the user of descriptive language;

transforming the text of the search request via a sentence transformer, wherein the sentence transformer comprises an embeddings language-model configured to transform the text of the search request by computing a vector embedding representative of a semantic meaning of the text of the search request; and searching the index using the computed vector embedding of the text of the search request by comparing a computed similarity between the vector embedding of the text of the search request against each of the vector embeddings stored in the index and returning as search results ones of the vector embeddings stored in the index having a similarity computed as being above a predetermined threshold.

14. The system of claim 13, wherein the computed similarity comprises a cosine similarity.

15. The system of claim 13, wherein the LLM comprises a neural network model having at least 1 billion parameters that is configured to take in text as an input and produce text as an output.

16. The system of claim 13, wherein the LLM comprises a neural network model having at least 3 billion parameters that is configured to take in text as an input and produce text as an output.

17. The system of claim 13, wherein the insight type determined for the first insight comprises a sentiment-aspect;
   wherein the step of determining the relevant portion of the conversation data of the first interaction comprises:
   performing, using a pretrained classifier model, sentiment analysis on the conversation data of the first interaction, the pretrained classifier model comprising a neural network configured to classify utterances as being a positive utterance, negative utterance, or neutral utterance;
   identifying, via the sentiment analysis, an utterance made by the customer that is classified as a negative utterance;
   determining the relevant portion of the conversation data in relation to the negative utterance by defining the relevant portion of the conversation data as including the negative utterance, a predetermined number of utterances occurring just prior to the negative utterance, and a predetermined number of utterances occurring just after the negative utterance.

18. The system of claim 13, wherein the insight type determined for the first insight comprises an intent of the customer;
   wherein the step of determining the relevant portion of the conversation data of the first interaction comprises determining that the relevant conversation portion comprises a predetermined number of utterances occurring at a beginning of the conversation data of the first interaction.

19. The system of claim 13, wherein the insight type determined for the first insight comprises an interaction resolution;
   wherein the step of determining the relevant portion of the conversation data of the first interaction comprises determining that the relevant conversation portion comprises a predetermined number of utterances occurring at an end of the conversation data of the first interaction.

20. The system of claim 13, wherein the computed similarity comprises a cosine similarity; and
   wherein the embeddings language-model of the sentence transformer comprises a pretrained neural networks configured to encode sentences into embedding vectors such that, once encoded, the embedding vectors of semantically similar sentences comprise a cosine similarity that is greater than a cosine similarity of the embedding vectors from semantically dissimilar sentences.

* * * * *